No. 874,580.
PATENTED DEC. 24, 1907.
A. FARKAS & J. KIEFFER.
GEARING.
APPLICATION FILED JAN. 22, 1907.
2 SHEETS—SHEET 1.
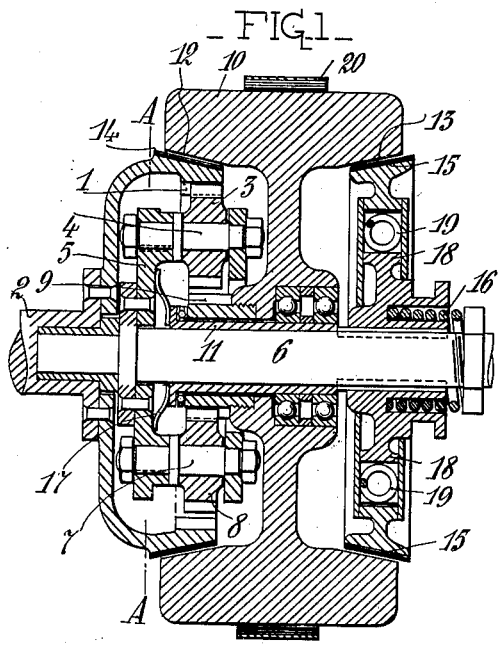
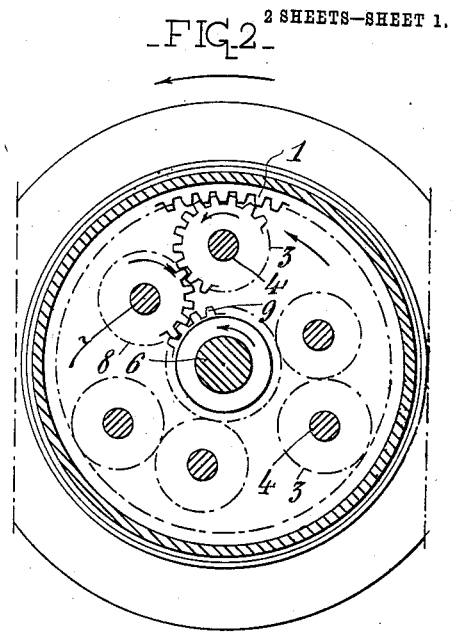
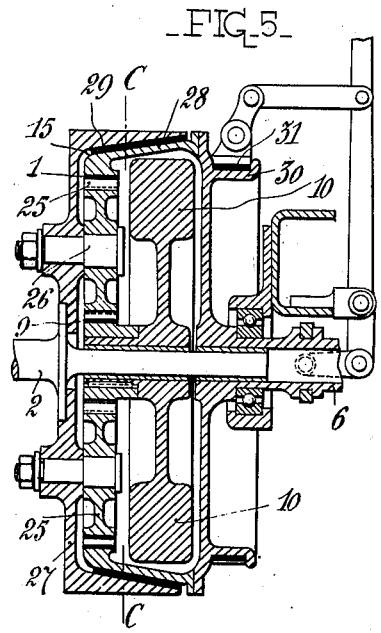
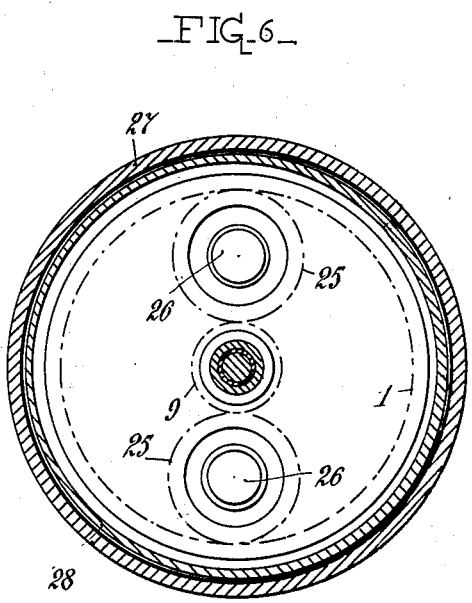

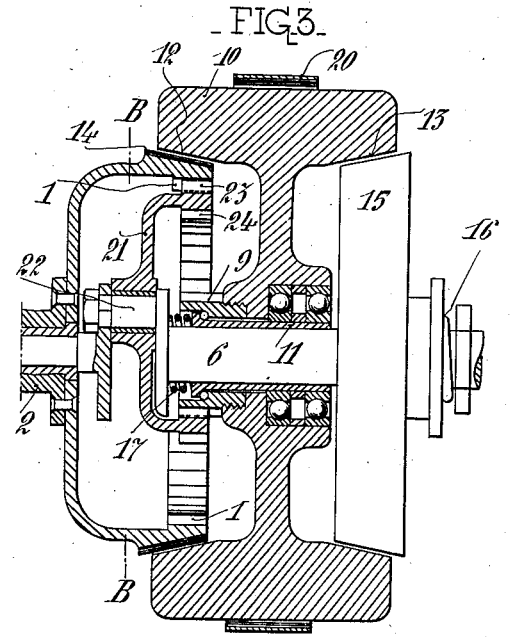

UNITED STATES PATENT OFFICE.

ARMAND FARKAS AND JOSEPH KIEFFER, OF BILLANCOURT, FRANCE.

GEARING.

No. 874,580.  Specification of Letters Patent.  Patented Dec. 24, 1907.

Application filed January 22, 1907. Serial No. 353,553.

*To all whom it may concern:*

Be it known that we, ARMAND FARKAS, a subject of the Emperor of Austria-Hungary, and JOSEPH KIEFFER, a subject of the Grand Duke of Luxemborg, both residing at Billancourt, France, have invented certain new and useful Improvements in or Relating to Gearing, of which the following is a specification.

This invention relates to a gearing for motor vehicles, chiefly based on the utilization of the momentum of a fly wheel rotating at great speed, the said fly wheel automatically assuming its speed when the engine is thrown out of engagement, owing to the intervention of any suitable gear then transmitting to the said fly wheel the force of the engine thrown out of engagement, for subsequent utilization of the said power or force for the purpose stated.

Among other advantages, this improved gearing enables speed reducing parts for the transmission of the driving movement at different speeds to be done away with, for it constitutes a kind of condenser of the force which has not been used up to then, of the engine working idly, which force, according to this invention, is now utilized. This momentum can be utilized either at one time for obtaining the starting, or intermittently for assisting in overcoming the resistance of the said vehicle when going uphill, the operating gear being suitably manipulated and throwing into engagement the device utilized for carrying out the method in question. By using a suitable multiple gear it becomes possible to drive the vehicle backwards at a reduced speed, by means of the same mechanism.

Several constructions of mechanism suitable for carrying out the invention, are illustrated, by way of example, in the accompanying drawings.

Figure 1 is a longitudinal section of a starting-mechanism embodying the invention designed also with a view to employing it to drive backwards, Fig. 2 is a cross-section on the line A—A of Fig. 1, Fig. 3 is a longitudinal section of another construction of a mechanism such as is shown in Figs. 1 and 2, Fig. 4 is a cross-section on the line B—B of Fig. 3, Fig. 5 also shows, in longitudinal section, a construction of a simplified mechanism, in the sense that it no longer comprises a device for backward driving, Fig. 6 is a cross-section on the line C—C of Fig. 5, Fig. 7 is a longitudinal section illustrating a modified construction of the preceding mechanisms. Fig. 8 is a cross-section on the line D—D of Fig. 7.

The mechanism shown in Figs. 1 and 2, comprises a ring with inner teeth 1, secured to the driving shaft 2 and engaging with satellites or loose pinions 3, of which the spindles 4 are mounted on a disk 5 secured to the driven shaft 6, transmitting the movement to the vehicle. The disk 5 carries also spindles 7 of other loose pinions 8 engaging, on the one hand, with the loose pinions 3, and, on the other hand, with a pinion 9 secured to the hub of a fly wheel 10 of a sufficiently large diameter and sufficiently great weight. This fly wheel 10 is mounted loose, either on balls or with ordinary friction, on a socket or sleeve 11 mounted on the shaft 6, so that it can slide on it longitudinally, thus accompanying the said fly wheel 10 in its longitudinal movements. The fly wheel 10, is provided, moreover, at the inner periphery of its lateral recesses, with conical surfaces 12 and 13 which respectively coöperate: the surface 12 with a cone 14 which forms the outside of the toothed ring 1, and the surface 13 with another cone 15 mounted on the driven shaft 6 so as to be able to slide longitudinally on the latter, while participating in its movement of rotation. The clutch cone 15 is exposed to the action of a strong spring 16 which has the tendency of forcing it against the fly wheel 10, and is sufficiently strong to overcome the action of another spring 17 having the tendency to keep the said fly wheel disengaged from the toothed ring 1.

In order to provide elastic connection between the cone 15 and its hub 18 connected to the shaft 6, springs 19 of a suitable shape are inserted between the radial arms respectively belonging to the said hub 18 and to the cone 15. The outer periphery of the fly wheel 10 is constituted so as to coöperate with a brake member 20, which may be a brake band or other suitable device, capable of stopping it.

The working is as follows. Assuming that the cone 15 is completely disengaged from the fly wheel 10, the latter will also be disengaged by the action of the spring 17, from the toothed ring 1. In that position of the parts, the movement of the driving shaft 2 is transmitted by the ring 1 to the loose pinions 3 and 8 of which the spindles 4 and 7 secured to the disk 5, remain fixed in space owing to the inertia of the vehicle which is supposed to be standing still. The loose pinions 3 and 8 serve then as intermediaries for transmitting to the pinion 9 of the fly wheel 10, a rotation in the same direction as that of the driving shaft, at a greater speed due to the difference of the diameters of the said pinion 9 and of the toothed ring 1. The fly wheel 10 having been started in that manner with a speed greater than that of the engine, if the clutch is thrown into engagement, as soon as the cone 15 comes into contact with the fly wheel 10, it will receive from the latter a strong impulse which will be gradually transmitted, by the intermediary of the springs 19, to the driven shaft 6 of the vehicle the inertia of which will then be overcome, and consequently the said vehicle will be started. By increasing then the engagement of the cone 15 with the fly wheel 10, longitudinal movement of the latter will be produced at the same time, and the said fly wheel will engage with the toothed ring 1, the result of which will be that the parts of the mechanism will form one block, and that the movement of the shaft 2 will be transmitted direct to the shaft 6 of the vehicle which will thus travel forward. Owing to the combination of the two clutch members 12 14 and 13 15, and of the springs 19, the action of the momentum of the fly wheel 10 is gradually transmitted to the shaft 6 without any injurious effect on the driving shaft 2. In order to bring about backward driving, the cone 15 being disengaged, it is sufficient to make the brake member 20 act, in order gradually to stop the fly wheel 10; owing to this braking action on the fly wheel 10 and while it is taking place, the momentum of the said fly wheel 10 is absorbed by the loose pinions 3—8 which under the impulse of the ring 1 revolve them round the pinion 9, rotating the latter backwards with a speed gradually increasing as the speed of the fly wheel is being reduced. When the latter is completely stopped, the movement then transmitted, brings about the backward driving of the vehicle.

The mechanism shown in Figs. 3 and 4 is a modified construction of that shown in Figs. 1 and 2 hereinbefore described. In this modified construction, the transmission of the driving movement in the same direction from the ring 1 to the pinion 9 of the fly wheel 10, is effected by means of a ring 21 rotating eccentrically relatively to the shaft 6 of the vehicle, on an eccentric crank pin 22 secured to the said shaft. The ring 21 is provided with outer teeth 23 engaging with the toothed ring 1, and with inner teeth 24 engaging with the pinion 9 of the fly wheel 10. The other parts are arranged in the same way as the corresponding parts in the construction illustrated in Figs. 1 and 2. The working is the same.

The mechanism shown in Figs. 5 and 6 is another construction of those already described, from which it differs merely by its parts being arranged only for starting the fly wheel 10 when the engine is thrown out of engagement, and for utilizing the momentum of the said fly wheel for starting the vehicle and driving forward only. The driving backward which cannot be obtained with this construction, can be effected by any suitable combination for the purpose. In this construction shown in Figs. 5 and 6, the transmission of movement to the pinion 9 of the fly wheel 10, is effected by means of loose pinions 25, the spindles 26 of which are mounted on a disk 27 secured to the driving shaft 2. These pinions 25 engage on the other hand with a toothed ring 1 depending from the shaft 6 transmitting movement to the vehicle, and made in the interior of a drum 28 surrounding the fly wheel 10 and provided outside with the clutch cone 15 which coöperates with a conical cup 29 made in the disk 27 of the driving shaft 2. The drum 28 is provided with a flange 30 on which is mounted a brake member such as band 31 the device for operating which is combined with that for operating the clutch cone 15, so as to bring about either the throwing out of engagement alone, or the throwing out of engagement and a stoppage of the drum 28, or the throwing into engagement.

The working is as follows. Assuming that the cones 15 and 29 are disengaged, and the drum 28 standing still, the movement of the driving shaft 2 will be transmitted by the disk 27 to the spindles 26 of the pinions 25 which revolve round the toothed ring 1 which is fixed at that moment and act on the pinion of the fly wheel 10 for rotating it in the same direction at a greater speed than that of the driving shaft 2. If during the time that the fly wheel 10 is thus rotating at a great speed, the braking action on the drum 28 is done away with, the momentum of the fly wheel 10 will at once be absorbed by the ring 1, and transmitted by the said ring to the driven shaft 6 of the vehicle this action taking place before the engine is thrown into engagement. As soon as the engine has been thrown into engagement, the parts secured together will rotate at the initial speed of the engine which will then act direct on the shaft 6 of the vehicle. When going up-hill, the throwing out of engagement will be effected alone, without applying the brake to the drum 28, the transmission will be effected at a reduced speed by the intermediary of the fly wheel 10, the momentum of which could then be utilized, whenever necessary, for effecting the starting for instance, after an accidental stoppage of the vehicle.

In the modified construction shown in Figs. 7 and 8, the ring 1 which transmits to the fly wheel 10 an increased speed at the moment of throwing out of engagement, is no longer supported in this construction either by the driving shaft 2, as in the construction shown in Figs. 1 to 4, or by a drum 28 capable of freely rotating or of being stopped as in Figs. 5 and 6, but is secured to the driven shaft 6 of the vehicle. The disk 27 depending on the driving shaft 2, forms a cup and is provided inside with two conical surfaces 32 and 33, one of which, 32, coöperates with the conical periphery of the fly wheel 10, while with the other can engage the outer conical surface of the flange 35 of the casing or box 36 carrying the pinions 25. The latter engage, on the one hand, with the central pinion 9 secured to the fly wheel 10, and, on the other hand, with the toothed ring 1 depending on the driven shaft 6. The inner conical surface of the flange 35 can come into engagement with the corresponding outer surface of a fixed cone 37, the hub 38 of which forms part of the support in which rotate concentrically the shaft 6 and the tubular hub 39 of the loose pinion casing or box 36. In this arrangement, the driven shaft or spindle 6 is constituted, as already stated, by the extended hub of the ring 1, and is mounted in the interior of the hub of the loose pinion box 36, so as to be capable of longitudinally sliding on the driving shaft 2 by means of any suitable operating mechanism 40 acting on the outer end of the shaft 6. The extended hub of the fly wheel 10 is itself mounted inside the shaft 6, so as to be able freely to rotate in it, while participating in the longitudinal movement given to the ring. A spring 41 inserted between the end of the hub of the fly wheel 10 and a collar 42 of the driving shaft 2, has the tendency of keeping the said fly wheel 10 in engagement with the driving cup 27. The loose pinion casing or box 36 can also be longitudinally moved by means of a suitable operating mechanism 43, acting on the outer end of its hub 39 and in such manner that its conical flange engages either with the driving cup 27 or with the fixed cone 37. The working of this construction is as follows. The driving shaft 2 rotating when the vehicle is standing still, and the fly wheel 10, as well as the loose pinion box 36 being disengaged, the said shaft 2 freely rotates without transmitting any movement. This position of parts corresponds to the engine being out of engagement. The vehicle still standing still and braked, if the pinion box 36 is operated, so as to bring its flange into engagement with the driving cup 27, the fly wheel 10 will be rotated at a greater speed than that of the engine. In fact, the ring 1 secured to the shaft 6, being unable to rotate, the loose pinions 25 will revolve in the interior of the said ring 1 and transmit to the central pinions 9 an increased speed in the same direction. The fly wheel 10, thus idly rotating at a greater speed than that of the driving shaft 2, acquires a very great momentum which is utilized to produce and facilitate the starting of the vehicle, as soon as the said fly wheel is brought into engagement with the driving cup 27. In fact, as soon as the said engagement has taken place, the momentum of the fly wheel is transmitted to the cup 27 and added to its driving action. As, on the other hand, the said cup is in engagement with the pinion box 36, it follows that the said force acts by means of the central pinion 9, at the same time as by means of the loose pinions 25, in order to drive the ring 1, and consequently the shaft 6, at the initial speed of the engine. As soon as the fly wheel is disengaged from the cup 27, the shaft 6 has tendency to move slower, but the fly wheel 10 acts by its momentum to maintain the movement of the vehicle until its speed reaches its maximum. It will be seen from the above that, when going uphill, the momentum of the fly wheel 10 could be utilized at any moment in order to assist by successively repeated operations of throwing out of engagement and into engagement, the traveling of the vehicle as already explained. In this construction, the backward driving at a reduced speed is obtained by keeping the fly wheel 10 in engagement with the driving cup 27, and by bringing the pinion box 36 into engagement with the fixed cone 37. In fact, the movement is transmitted by the central pinion 9 to the ring 1 with the loose pinions 25 rotating in place, as intermediaries for reversing the direction of rotation.

What we claim as our invention and desire to secure by Letters Patent is:—

1. The combination of a driving shaft, a driven shaft, a fly-wheel normally rotating in unison with said shafts, and means whereby motion is imparted from the driving shaft to the fly-wheel when the driven shaft is disconnected from the driving shaft.

2. The combination of a driving shaft, a driven shaft, a fly-wheel normally rotating in unison with said shafts, and means whereby motion is imparted from the driving shaft to the fly-wheel to cause the fly-wheel to rotate at a greater speed than the driving shaft when the driven shaft is disconnected from the driving shaft.

3. The combination of a driving shaft, a driven shaft, a fly-wheel normally rotating in unison with said shafts, means whereby motion is imparted from the driving shaft to the fly-wheel when the driven shaft is disconnected from the driving shaft, and means for transmitting the motion from the fly-wheel to the driven shaft.

4. The combination of a driving shaft, a driven shaft, a fly-wheel normally connected to both of said shafts to rotate in unison therewith, means for breaking the connection between the fly-wheel and the driven shaft, and means whereby the fly-wheel is rotated by the driving shaft when the connection is broken between the fly wheel and the driven shaft.

5. The combination of a driving shaft, a driven shaft, a fly-wheel, a connection between the fly-wheel and the shafts causing the parts to rotate in unison, means for interrupting said connection, and a gearing between the driving shaft and the fly-wheel whereby the motion is transmitted to the fly-wheel only when said connection is interrupted.

6. The combination of a driving shaft, a driven shaft, a ring secured to the driving shaft and having inner teeth and an outer conical surface, a disk connected to the driven shaft, a plurality of loose pinions mounted on the disk and engaging said ring-teeth, a second disk mounted on the driven shaft and capable of moving longitudinally thereof and provided with a conical surface, a fly-wheel mounted on the driven shaft and capable of moving longitudinally thereof, and provided with a pair of conical friction surfaces adapted to engage the corresponding surface on the ring and on said second disk, a pinion on the fly-wheel hub, a second series of loose pinions mounted on said first-named disk and engaging the first-mentioned loose pinions and the fly-wheel hub pinion, a spring tending to hold the ring surface out of engagement with the fly-wheel coned surface, a second spring tending to hold the second disk in engagement with the coned surface of the fly-wheel, and a brake member operatively connected to the fly-wheel.

In testimony whereof we have signed our names to this specification in the presence of two subscribing witnesses.

ARMAND FARKAS.
JOSEPH KIEFFER.

Witnesses:
　EDWARD D. DIESEL,
　JACK H. BAKER.